US012597197B2

(12) United States Patent
Lim

(10) Patent No.: US 12,597,197 B2
(45) Date of Patent: Apr. 7, 2026

(54) LOCAL SPACE TEXTURE MAPPING BASED ON REVERSE PROJECTION

(71) Applicant: Roblox Corporation, San Mateo, CA (US)

(72) Inventor: Xuan Wei Adrian Lim, Pittsburgh, PA (US)

(73) Assignee: Roblox Corporation, San Mateo, CA (US)

( * ) Notice: Subject to any disclaimer, the term of this patent is extended or adjusted under 35 U.S.C. 154(b) by 124 days.

(21) Appl. No.: 18/641,337

(22) Filed: Apr. 20, 2024

(65) Prior Publication Data

US 2024/0355035 A1 Oct. 24, 2024

Related U.S. Application Data

(60) Provisional application No. 63/497,538, filed on Apr. 21, 2023.

(51) Int. Cl.
*G06T 15/04* (2011.01)
*G06T 15/06* (2011.01)
*G06V 10/56* (2022.01)

(52) U.S. Cl.
CPC .............. *G06T 15/04* (2013.01); *G06T 15/06* (2013.01); *G06V 10/56* (2022.01)

(58) Field of Classification Search
CPC .......... G06T 15/04; G06T 15/06; G06V 10/56
See application file for complete search history.

(56) References Cited

U.S. PATENT DOCUMENTS

2020/0026516 A1* 1/2020 Li ............................ B03C 1/288
2024/0161430 A1* 5/2024 Dhingra .................. G06T 15/04

OTHER PUBLICATIONS

David (Grue) Debry, et al., "Painting and rendering textures on unparameterized models", ACM Trans. Graph. 21, 3 (Jul. 2002), 763-768. https://doi.org/10.1145/566654.566649.
Gábor Liktor, "Ray tracing implicit surfaces on the GPU", In 12th Central European Seminar on Computer Graphics (CESCG 2008 Proceedings). Technische Universität Wien, Institut für Computergraphik und Algorithmen.

(Continued)

*Primary Examiner* — Chong Wu
(74) *Attorney, Agent, or Firm* — IP Spring

(57) ABSTRACT

Implementations described herein relate to methods, systems, and computer-readable media to render an object with a decal texture applied thereon. In some implementations, a computer-implemented method includes receiving a polygon mesh of an object. The method further includes determining a positional map and a normal map by applying a rasterization function to the polygon mesh. The method further includes receiving a target texture map associated with the object and a decal texture to be placed on the target texture map. The method further includes determining a position, an orientation, and a scale of the decal texture with respect to a local space of the polygon mesh. The method further includes determining placement of the decal texture onto the target texture map by performing a per-pixel projection operation. The method further include rendering the object with the decal texture applied thereon.

20 Claims, 6 Drawing Sheets

(56) References Cited

OTHER PUBLICATIONS

Takeo Igarashi, et al., "Adaptive Unwrapping for Interactive Texture Painting", In Proceedings of the 2001 Symposium on Interactive 3D Graphics (13D '01). Association for Computing Machinery, New York, NY, USA, 209-216. https://doi.org/10.1145/364338.364404.

Tomas Akenine-Moller, et al., "Stochastic Rasterization using Time-Continuous Triangles", In Graphics hardware, vol. 11. (2007).

Yi Zhou, et al., "Pmomo: Projection Mapping on Movable 3D Object", In Proceedings of the 2016 CHI Con-ference on Human Factors in Computing Systems (San Jose, California, USA) (CHI '16). Association for Computing Machinery, New York, NY, USA, 781-790. https://doi.org/10.1145/2858036.2858329.

\* cited by examiner

LOCAL SPACE TEXTURE MAPPING BASED ON REVERSE PROJECTION

CROSS-REFERENCE TO RELATED APPLICATIONS

This application is a non-provisional application that claims priority under 35 U.S.C. § 119(e) to U.S. Provisional Patent Application No. 63/497,538, filed on Apr. 21, 2023, the contents of which are hereby incorporated by reference herein in its entirety.

TECHNICAL FIELD

Embodiments relate generally to online virtual experience platforms, and more particularly, to methods, systems, and computer-readable media to map graphical content to a three-dimensional (3D) object.

BACKGROUND

Online platforms, such as virtual experience platforms and online gaming platforms, can include a decal, such as a pattern or image, that is to be transferred or painted on the surface of an object, e.g., a three-dimensional (3D) avatar that is present in a virtual environment and is controlled by a user, or any other virtual 3D object. Currently, techniques to apply a decal to an object have limited accuracy that cause distortions.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to local space texture mapping based on reverse projection.

According to one aspect of the present disclosure, a computer-implemented method is provided. The method may include receiving, by a processor, a polygon mesh of an object. The method may include determining, by the processor, a positional map and a normal map associated with the polygon mesh by applying a rasterization function to the polygon mesh. The method may include receiving, by the processor, a target texture map associated with the object and a decal texture to be placed on the target texture map. The method may include determining, by the processor, a position, an orientation, and a scale of the decal texture with respect to a local space of the polygon mesh by applying a transform matrix to the target texture map and the decal texture. The method may include determining, by the processor, placement of the decal texture onto the target texture map by performing a per-pixel projection operation based on the positional map and the normal map associated with the polygon mesh and the position, the orientation, and the scale of the decal texture. The method may include rendering, by the processor, the object with the decal texture applied thereon based on the placement of the decal texture onto the target texture map.

In some implementations, performing the per-pixel projection operation may include performing back-face culling based on the normal map to determine visible surfaces of the polygon mesh of the object.

In some implementations, performing the per-pixel projection operation may include performing a plurality of dot-product computations based on the target texture map and the decal texture to determine a set of pixels associated with a projection of the decal texture onto the target texture map.

In some implementations, performing the per-pixel projection operation may further include performing a ray-cast operation on the set of pixels to determine pixel locations at which the decal texture touches the target texture map.

In some implementations, performing the per-pixel projection operation may further include applying a color-value associated with the decal texture to the pixel locations at which the decal texture touches the target texture.

In some implementations, rendering the object may include rendering the object with the color-value associated with the decal texture applied to the pixel locations at which the decal texture touches the target texture map.

In some implementations, the positional map may indicate local-space coordinates of pixels associated with the polygon mesh. In some implementations, the normal map may indicate a respective normal vector for each mesh face of the polygon mesh.

According to another aspect of the present disclosure, a computing device is provided. The computing device may include a processor and a memory coupled to the processor and storing instructions, which when executed by the processor, cause the processor to perform operations. The operations may include receiving a polygon mesh of an object. The operations may include determining a positional map and a normal map associated with the polygon mesh by applying a rasterization function to the polygon mesh. The operations may include receiving a target texture map associated with the object and a decal texture to be placed on the target texture map. The operations may include determining a position, an orientation, and a scale of the decal texture with respect to a local space of the polygon mesh by applying a transform matrix to the target texture map and the decal texture. The operations may include determining placement of the decal texture onto the target texture map by performing a per-pixel projection operation based on the positional map and the normal map associated with the polygon mesh and the position, the orientation, and the scale of the decal texture. The method may include rendering the object with the decal texture applied thereon based on the placement of the decal texture onto the target texture map.

In some implementations, performing the per-pixel projection operation may include performing back-face culling based on the normal map to determine visible surfaces of the polygon mesh of the object.

In some implementations, performing the per-pixel projection operation may include performing a plurality of dot-product computations based on the target texture map and the decal texture to determine a set of pixels associated with a projection of the decal texture onto the target texture map.

In some implementations, performing the per-pixel projection operation may further include performing a ray-cast operation on the set of pixels to determine pixel locations at which the decal texture touches the target texture map.

In some implementations, performing the per-pixel projection operation may further include applying a color-value associated with the decal texture to the pixel locations at which the decal texture touches the target texture.

In some implementations, rendering the object may include rendering the object with the color-value associated with the decal texture applied to the pixel locations at which the decal texture touches the target texture map.

In some implementations, the positional map may indicate local-space coordinates of pixels associated with the polygon mesh. In some implementations, the normal map may indicate a respective normal vector for each mesh face of the polygon mesh.

According to another aspect of the present disclosure, a non-transitory computer-readable medium is provided. The non-transitory computer-readable medium may include instructions stored thereon that, when executed by a processor, cause the processor to perform operations. The operations may include receiving a polygon mesh of an object. The operations may include determining a positional map and a normal map associated with the polygon mesh by applying a rasterization function to the polygon mesh. The operations may include receiving a target texture map associated with the object and a decal texture to be placed on the target texture map. The operations may include determining a position, an orientation, and a scale of the decal texture with respect to a local space of the polygon mesh by applying a transform matrix to the target texture map and the decal texture. The operations may include determining placement of the decal texture onto the target texture map by performing a per-pixel projection operation based on the positional map and the normal map associated with the polygon mesh and the position, the orientation, and the scale of the decal texture. The method may include rendering the object with the decal texture applied thereon based on the placement of the decal texture onto the target texture map.

In some implementations, performing the per-pixel projection operation may include performing back-face culling based on the normal map to determine visible surfaces of the polygon mesh of the object.

In some implementations, performing the per-pixel projection operation may include performing a plurality of dot-product computations based on the target texture map and the decal texture to determine a set of pixels associated with a projection of the decal texture onto the target texture map.

In some implementations, performing the per-pixel projection operation may further include performing a ray-cast operation on the set of pixels to determine pixel locations at which the decal texture touches the target texture map.

In some implementations, performing the per-pixel projection operation may further include applying a color-value associated with the decal texture to the pixel locations at which the decal texture touches the target texture.

In some implementations, rendering the object may include rendering the object with the color-value associated with the decal texture applied to the pixel locations at which the decal texture touches the target texture map.

In some implementations, the positional map may indicate local-space coordinates of pixels associated with the polygon mesh. In some implementations, the normal map may indicate a respective normal vector for each mesh face of the polygon mesh.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
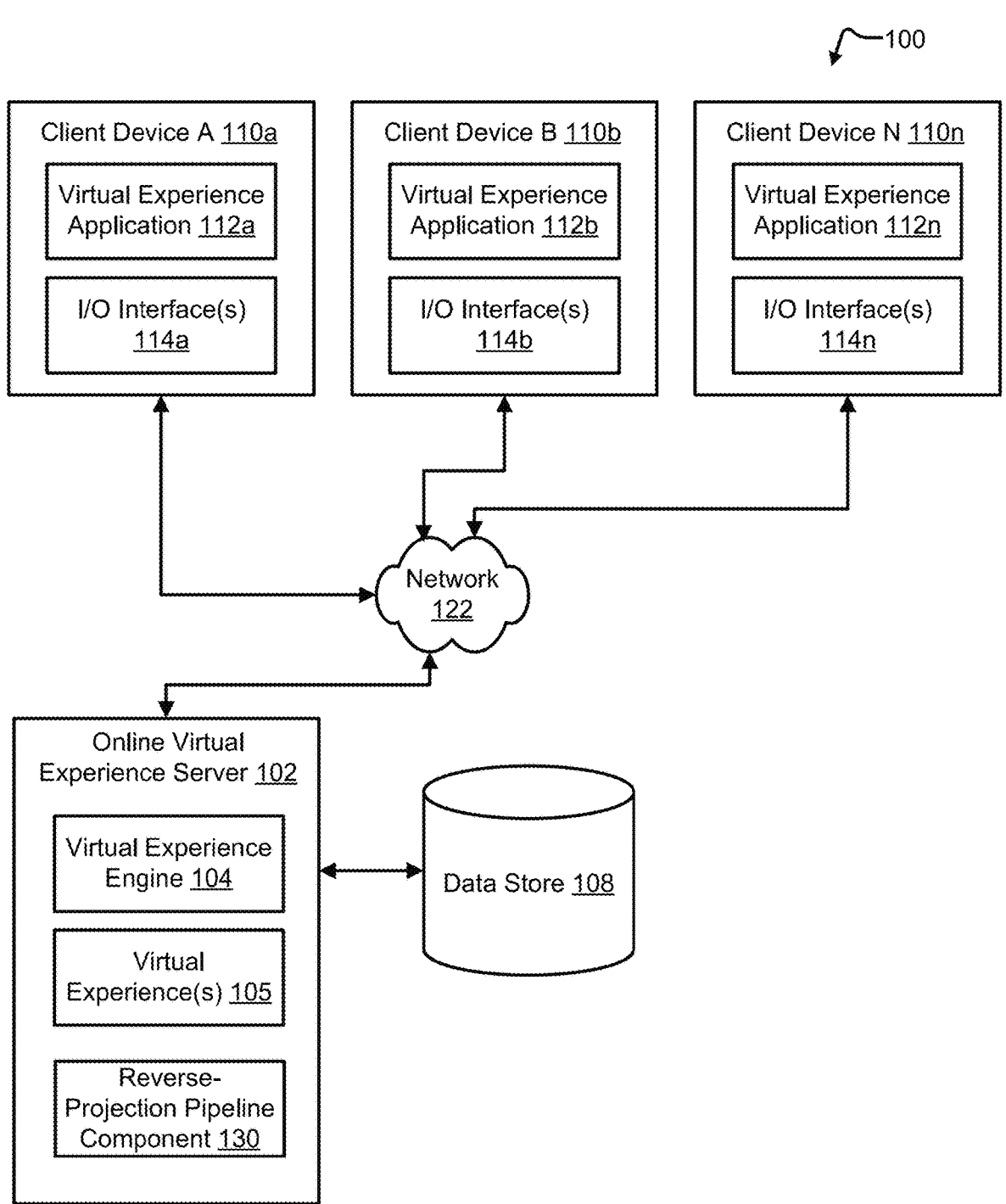
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Various embodiments are described herein in the context of 3D avatars that are used in a 3D virtual experience or environment. Some implementations of the techniques described herein may be applied to various types of 3D environments, such as a virtual reality (VR) conference, a 3D session (e.g., an online lecture or other type of presentation involving 3D avatars), a virtual concert, an augmented reality (AR) session, or in other types of 3D environments that may include one or more users that are represented in the 3D environment by one or more 3D avatars.

The present disclosure provides a reverse-projection technique to project and color a decal texture onto the textured surface of a 3D model of a virtual object. By updating the texture map of the 3D model from the perspective of the model, the ability to customize and personalize the look and feel of the model can be achieved using the techniques described herein. Such customization may be beneficial in designing avatars and objects that fit the overall theme of a virtual experience or game.

By using projection techniques that perform computations in the local space and computations that are outward-looking (e.g., reverse projection), users that access a virtual experience or game with different levels of computational capability (e.g., low-end mobile devices to high-end gaming computers with GPUs) can receive personalized experience graphical assets and other graphics-related features of their games. The disclosed techniques provide an improvement in the speed and versatility of model painting (the process of applying a decal onto a surface of a virtual 3D object, or directly applying paint to the surface of a 3D object).

Various implementations described herein produce a painted 3D model of an object by using reverse projection texture mapping in local space. In traditional projection, a ray is cast from a projector to a target 3D object or a projection matrix is computed from the projector to the target 3D object. In contrast, the present technique compute a representation of the 3D object in local-space and then determine whether those points intercept with the projection, which is why it is referred to as a reverse projection. The techniques can be implemented on devices with different computational ranges/capacities. For the model painting to be performed on computing devices and in real-time (or near real-time) in contexts like games and/or virtual environments, the implementations described herein can be implemented with low computational costs by painting the decal texture directly on the target texture.

For instance, by supporting back-face culling, the need to perform projection on surface of the 3D object when it's surface is facing away from the projector is eliminated. Taking a sphere as an example of a 3D object, 50% of all surfaces can be removed from computation since half the object will normally not be facing the projector. Per-pixel projection improves accuracy and cost because the final result is always a texture. This texture has a finite space as a 2D texture. In other projection techniques, there is a "many-to-one projection," where for each final pixel that is projected multiple projections are performed. One example of a many-to-one projection the ray-casting technique, where multiple rays are cast to find rays that land on the object's surface. To increase the odds of a ray cast landing on the object's surface, the operation casts an undue number of rays, typically in an order of magnitude higher than the total final pixel count.

Another advantage of the techniques described herein is that the projection is bounded by the dimensions of the decal-transform matrix, e.g., O(width*height). This reduces computational complexity. Further, since a projection map (the positional and normal map) is cached and computed in local space, there is no need to recompute the positional and normal maps when the user performs global-space manipulation (changing their camera view, moving the projector). Instead, using the techniques described herein, the positional and normal maps are only recomputed when the 3D object changes (e.g., when the mesh changes such as when the sleeves of a t-shirt are removed). This further simplifies computational complexity.

Compared to directly placing a decal on the texture of a 3D object, which loses continuity at edges of the object's mesh, the present techniques maintain conformity along the edges of the mesh since the decal image is projected as opposed to overlayed. The present techniques do not use a depth map as in traditional rasterization based projection, which increases accuracy since depth information is not quantized and compressed.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, a client device 110 (or multiple client devices), and a third party server 118, all connected via a network 122.

The online virtual experience server 102 can include, among other things, a virtual-experience engine 104, one or more virtual experiences 105, and a reverse-projection pipeline component 130. The online virtual experience server 102 may be configured to provide virtual experiences 105 to one or more client devices 110, and to provide automatic generation of inferred skeletal structures via the reverse-projection pipeline component 130, in some implementations.

Data store 108 is shown coupled to online virtual experience server 102 but in some implementations, can also be provided as part of the online virtual experience server 102. The data store may, in some implementations, be configured to store advertising data, user data, engagement data, and/or other contextual data in association with the reverse-projection pipeline component 130.

The client devices 110 (e.g., 110a, 110b, 110n) can include a virtual experience application 112 (e.g., 112a, 112b, 112n) and an I/O interface 114 (e.g., 114a, 114b, 114n), to interact with the online virtual experience server 102, and to view, for example, graphical user interfaces (GUI) through a computer monitor or display (not illustrated). In some implementations, the client devices 110 may be configured to execute and display virtual experiences, which may include virtual user engagement portal s as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the online virtual experience server 102.

In some implementations, online virtual experience server 102 or client device 110 may include the virtual-experience engine 104 or virtual experience application 112. In some implementations, virtual-experience engine 104 may be used for the development or execution of virtual experiences 105. For example, virtual-experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual-experience engine 104 may generate commands that help compute and render the virtual experience (e.g., rendering commands, collision commands, physics commands, etc.).

The online virtual experience server 102 using virtual-experience engine 104 may perform some or all the virtual experience engine functions (e.g., generate physics commands, rendering commands, etc.), or offload some or all the virtual experience engine functions to virtual-experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience or another GUI of the network environment 100, a user may create an avatar that includes different body parts from different libraries. Additional details of the reverse-projection pipeline component 130 are provided below.

Figure 2:
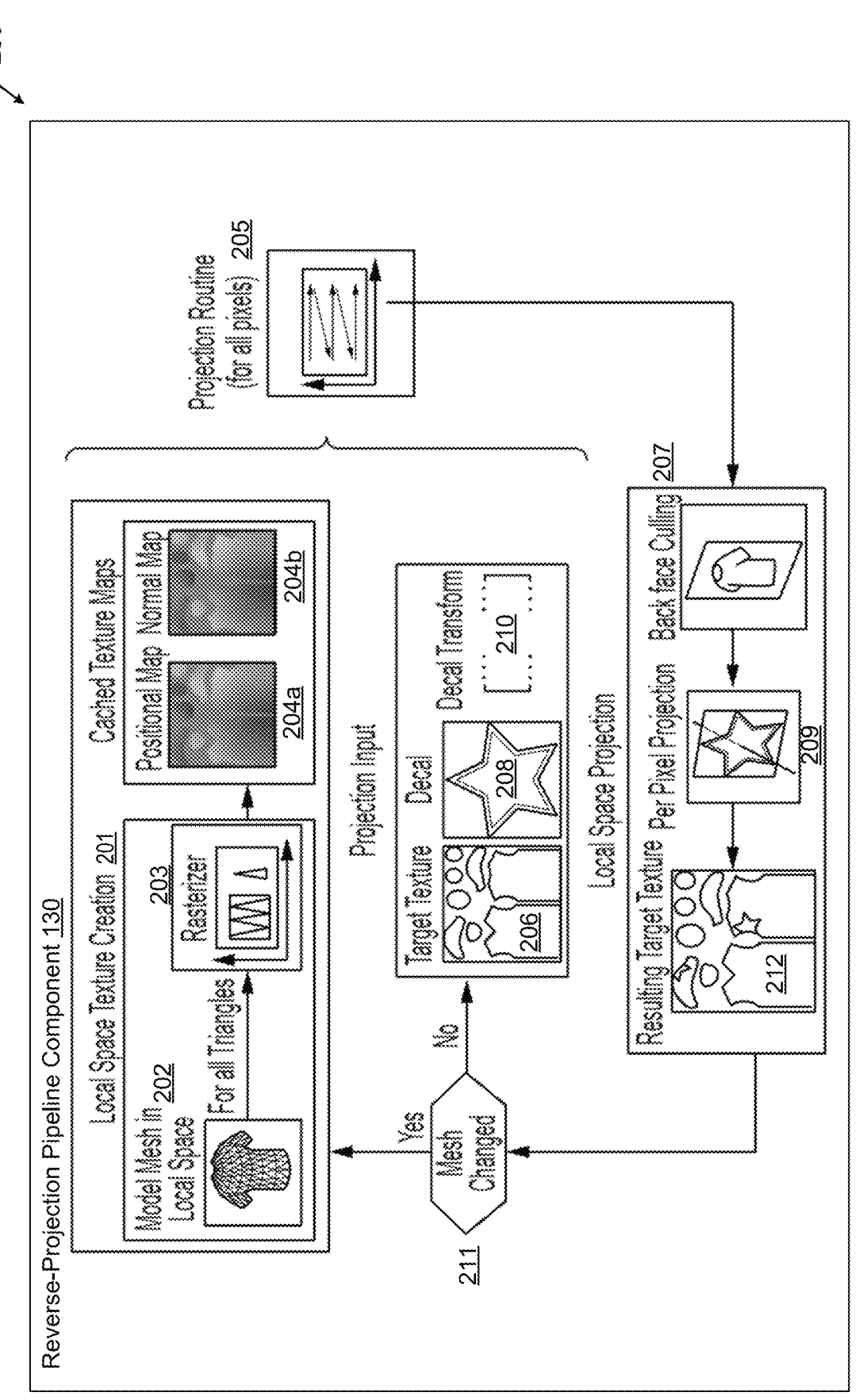
FIG. 2 is a diagram of an example reverse-projection pipeline component, in accordance with some implementations.

FIG. 2 is a schematic diagram 200 of operations performed by the reverse-projection pipeline component 130 of FIG. 1, in accordance with some implementations.

Referring to FIG. 2, to perform (at 201) local space texture creation, the reverse-projection pipeline component 130 may receive a polygon mesh 202 of an object (e.g., a 3-dimensional (3D) model mesh in local space). The coordinates of each vertex of the polygon mesh are indicated with respect to the local space of the object, e.g., rather than the world space in which the object is located. The local space of the object may be defined with respect to the object's center point, while the world space may be defined with respect to the center of the world in which the object is located, for example. The reverse-projection pipeline component 130 may apply (at 203) a rasterization function to the polygon mesh 202 to determine a positional map 204a and a normal map 204b.

The rasterization function may iterate the mesh faces (e.g., polygons) in the polygon mesh 202 and linearly interpolate the positional and normal information for each mesh face. The output of the rasterization function is an overall positional map 204a and normal map 204b. In some implementations, the positional map 204a may be a point cloud texture or any other type of output that includes the position. The positional map 204a may indicate local-space coordinates of pixels associated with the polygon mesh 202. The normal map 204b may use 3-axis of information (x, y, z), as compared to 2-axis of information from a traditional tangent-space normal map. The normal map 204b may indicate a respective normal vector for each mesh face (e.g., polygon) of the polygon mesh 202.

The reverse-projection pipeline component 130 may receive a target texture map 206 associated with the object and a decal texture 208 (e.g., graphical content) to be placed on the object's target texture map 206. Any image can be used as a decal so long as it has color values associated therewith to produce the decal texture 208. For instance, any image taken from the internet or a user's phone may be used as a decal.

Decal transform 210 may be applied to the target texture map 206 and the decal texture 208. The decal transform 210 uses a transformation matrix that provides the position, the orientation, and the scale of the decal texture 208 with respect to the local space of the polygon mesh 202, e.g., corresponding to the target texture map 206.

The reverse-projection pipeline component 130 may perform (at 205) a per-pixel projection operation (e.g., reverse projection of pixels onto which the decal is placed) using the positional map 204*a*, the normal map 204*b*, and the position, the orientation, and the scale of the decal texture 208 to determine placement of the decal texture 208 onto the target texture map 206. Since each pixel does not affect the neighboring pixel, the per-pixel projection operation can be parallelized and batched in the central processing unit (CPU) and/or graphics processing unit (GPU). The per-pixel projection operation improves accuracy over traditional projection since a traditional raster (e.g., forward projection) relies on a depth map and loses depth information due to quantization.

To implement the per-pixel projection operation, the reverse-projection pipeline component 130 may perform (at 207) back-face culling based on the normal map 204*b* to determine visible surfaces of the polygon mesh 202 of the object.

Figure 3:
FIG. 3 is a diagram of an example back-face culling operation, in accordance with some implementations.
Figure 3:
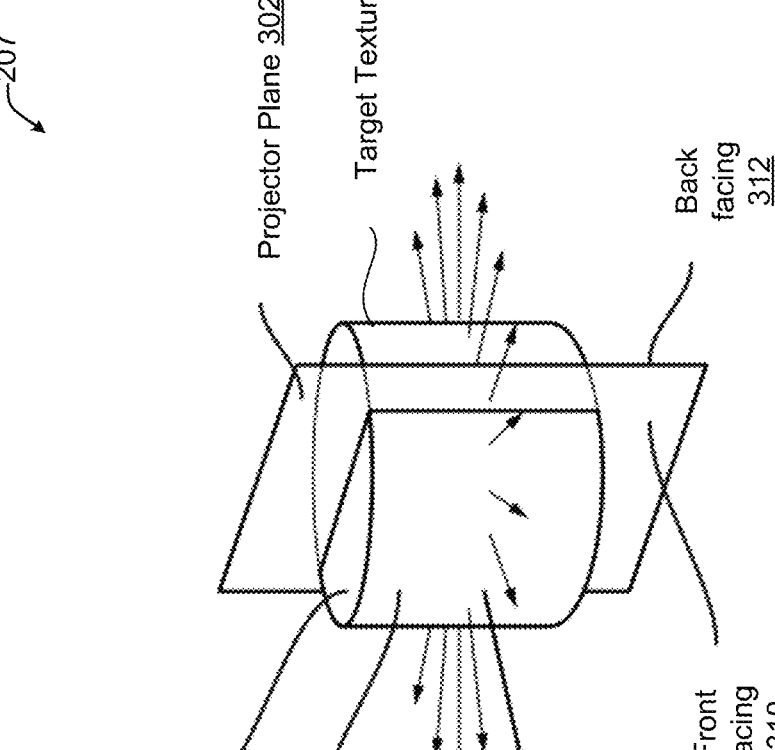

FIG. 3 is a diagram 300 of an example back-face culling operation, in accordance with some implementations. Referring to FIG. 3, using normals 304 identified from the normal map 204*b*, the reverse-projection pipeline component 130 may perform back-face culling on the target texture 320 to remove surfaces (e.g., inside surface 306 and back-facing surface 312) that face away from the user (e.g., not visible to the user) from the computation, thereby reducing the computational cost. The back faces may be identified by checking the normals 304 of the points that are facing away from the projector. The reverse-projection pipeline component 130 may perform a plurality of dot-product computations based on the target texture map 206 and the decal texture 208 to determine a set of pixels associated with a projection (e.g., a projector plane 302) of the decal texture 208 onto the target texture map 206. If the dot project is greater than 0, the pixel is facing away from the projector and is ignored. If the dot product is 0, the pixel is facing at a right angle, and thus not available for projection, and is ignored. If the dot product is less than 0, the pixel is facing to the projector and will be used for projection. In the example of FIG. 3, the set of pixels associated with the projection may include pixels associated with the outside surface 308 and the front-facing surface of the target texture 320.

Referring again to FIG. 2, to perform the per-pixel projection operation, in some implementations, the reverse-projection pipeline component 130 may perform (at 209) a ray-cast operation on the set of pixels identified by the back-face culling to determine pixel locations at which the decal texture 208 touches the target texture map 206.

Figure 4:
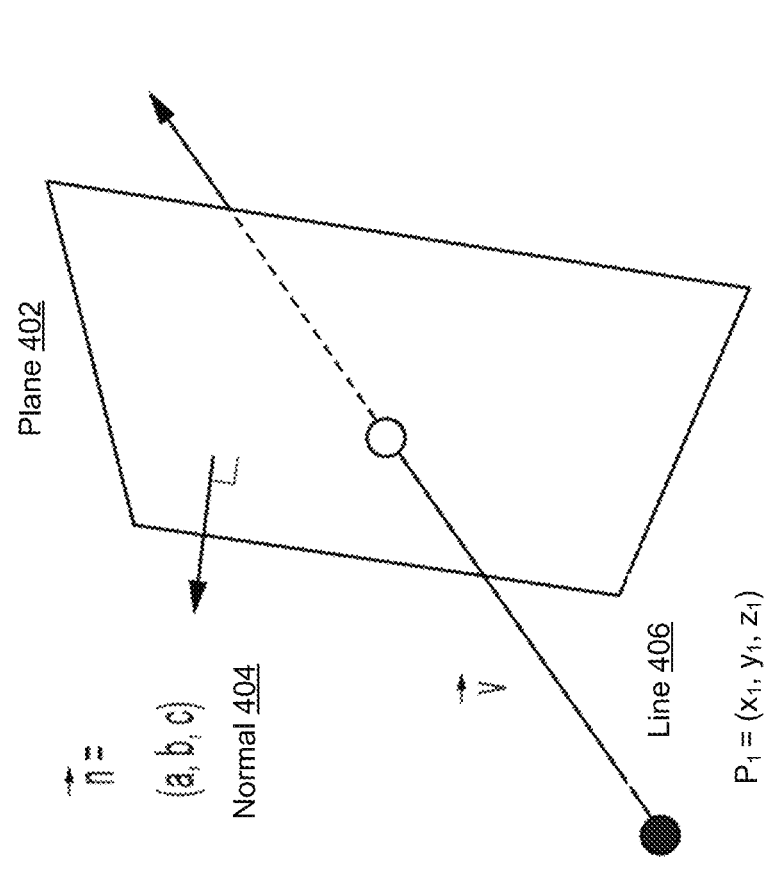
FIG. 4 is a diagram of an example per-pixel projection operation, in accordance with some implementations.

FIG. 4 is a diagram 400 of an example per-pixel projection operation, in accordance with some implementations. Referring to FIG. 4, the reverse-projection pipeline component 130 may use the plane 402 of the decal texture 208, the normal 404 of the plane 402, and a line projection 406 from the target texture map 206 to determine pixel locations at which the decal texture 208 touches the target texture map 206. The ray-cast operation also returns the position of the decal texture 208, from which the color (or other visual characteristic) of the decal texture 208 is copied to the target texture map 206, which produces resulting target texture map 212. In FIG. 4, the line 406 (a ray) originates from the target position. The line 406 is the opposite of the normal 404 (e.g., where the projector is looking). The line 406 is infinite, since a back-face culling check was performed (dot product that is <0), the line 406 will always hit the plane 402. The plane 402 is mathematically infinite. When the plane 402 is intercepted, it can then be determined where on the plane 402 the line 406 intercepts.

Referring again to FIG. 2, the reverse-projection pipeline component 130 may determine (at 211) whether the polygon mesh is changed after the resulting target texture map 212 is determined. For example, the polygon mesh for a 3D avatar may change when accessories are added (e.g., the avatar wears a jacket on top of a shirt, puts on a hat, etc.) or removed (e.g., removal of the sleeves of a shirt). When the polygon mesh changes, the operations may return to 201, where the reverse-projection pipeline component 130 may receive a new polygon mesh of a shirt without sleeves.

The operations may be rerun to obtain a new resulting target texture map with the decal texture placed thereon. Otherwise, when the polygon mesh 202 is not changed, the reverse-projection pipeline component 130 may render the object based on the polygon mesh 202, the target texture map 206, and the decal texture 208 placed on the target texture map 206 (e.g., the resulting target texture map 212). Using a local space texture map rather than, e.g., a world space, the number and/or complexity of the mathematical operations may be reduced, which allows decal texture projection mapping with a reduced computational cost.

Figure 5:
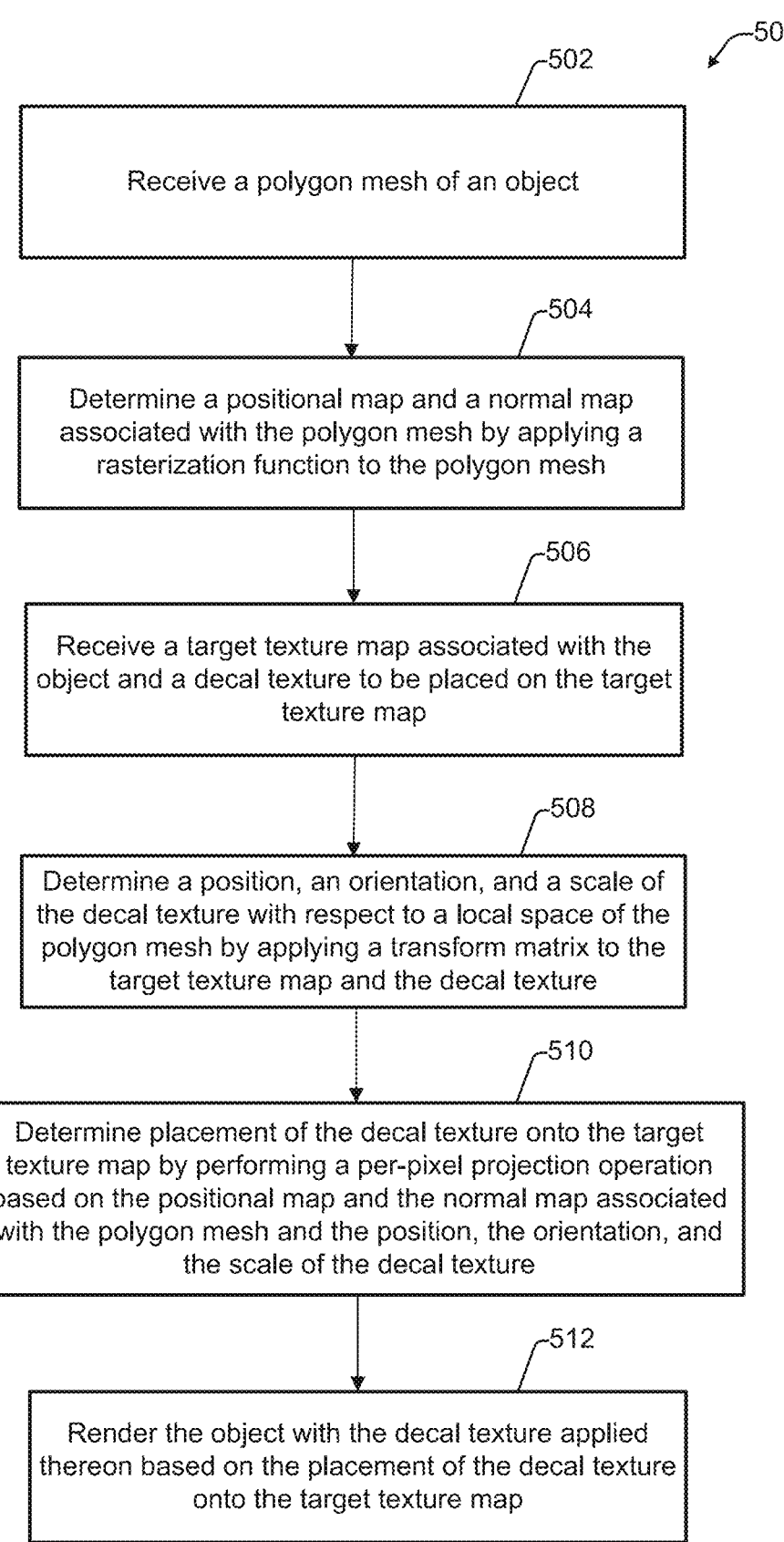
FIG. 5 is a flow chart of an example method of reverse projection for decal texture placement, in accordance with some implementations.

FIG. 5 is a flowchart of an example method 500 of reverse projection for decal texture placement, in accordance with some implementations.

In some implementations, method 500 can be implemented, for example, on a server 102 described with reference to FIG. 1. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, method 500, or portions of the method, can be initiated automatically by a system. In some implementations, the implementing system is a first device. For example, the method (or portions thereof) can be periodically performed, or performed based on one or more particular events or conditions, e.g., upon a user request and/or one or more other conditions occurring which can be specified in settings read by the methods.

The operations may begin at block 502. At block 502, a polygon mesh of an object may be received. For example, referring to FIG. 2, the reverse-projection pipeline component 130 may receive a polygon mesh 202 of an object (e.g., a model mesh in local space). The coordinates of each vertex of the polygon mesh are indicated with respect to the local space of the object, e.g., rather than the room space or world space in which the object is located.

Block 502 may be followed by block 504. At block 504, a positional map and a normal map associated with the polygon mesh may be determined by applying a rasterization function to the polygon mesh. For example, referring to FIG. 2, the reverse-projection pipeline component 130 may apply (at 203) a rasterization function to the polygon mesh 202 to determine a positional map 204*a* and a normal map 204*b*.

Block 504 may be followed by block 506. At block 506, a target texture map associated with the object and a decal texture to be placed on the target texture map may be received. For example, referring to FIG. 2, the reverse-projection pipeline component 130 may receive a target texture map 206 associated with the object and a decal texture 208 (e.g., graphical content) to be placed on the target texture map 206.

Block 506 may be followed by block 508. At block 508, a position, an orientation, and a scale of the decal texture with respect to a local space of the polygon mesh may be determined by applying a transform matrix to the target texture map and the decal texture. For example, referring to FIG. 2, a decal transform 210 may be applied to the target texture map 206 and the decal texture 208. The decal transform 210 uses a transformation matrix that provides the position, the orientation, and the scale of the decal texture 208 with respect to the local space of the polygon mesh 202, e.g., corresponding to the target texture map 206.

Block 508 may be followed by block 510. At block 510, placement of the decal texture onto the target texture map may be determined by performing a per-pixel projection operation based on the positional map and the normal map associated with the polygon mesh and the position, the orientation, and the scale of the decal texture. For example, referring to FIGS. 2-4, the reverse-projection pipeline component 130 may perform (at 205) a per-pixel projection operation (e.g., a projection routine) using the positional map 204*a*, the normal map 204*b*, and the position, the orientation, and the scale of the decal texture 208 to determine placement of the decal texture 208 onto the target texture map 206. To implement the per-pixel projection operation, the reverse-projection pipeline component 130 may perform (at 207) back-face culling based on the normal map 204*b* to determine visible surfaces of the polygon mesh 204 of the object. For instance, referring to FIG. 3, using normals 304 identified from the normal map 204*b*, the reverse-projection pipeline component 130 may perform back-face culling on the target texture 320 to ignore surfaces (e.g., inside surface 306 and back-facing surface 312) that face away from the user (e.g., not visible to the user), thereby reducing the computational cost. The reverse-projection pipeline component 130 may perform a plurality of dot-product computations based on the target texture map 206 and the decal texture 208 to determine a set of pixels associated with a projection (e.g., a projector plane 302) of the decal texture 208 onto the target texture map 206. If the dot project is greater than 0, the pixel is facing away from the projector and is ignored. If the dot product is 0, the pixel is facing at a right angle, and thus not available for projection, and is ignored. If the dot product is less than 0, the pixel is facing to the projector and will be used for projection. In the non-limiting example of FIG. 3, the set of pixels associated with the projection may include pixels associated with the outside surface 308 and the front-facing surface of the target texture 320. Referring again to FIG. 2, to perform the per-pixel projection operation, the reverse-projection pipeline component 130 may perform (at 209) a ray-cast operation on the set of pixels identified by the back-face culling to determine pixel locations at which the decal texture 208 touches the target texture map 206. For example, referring to FIG. 4, the reverse-projection pipeline component 130 may use the plane 402 of the decal texture 208, the normal 404 of the plane 402, and a line projection 406 from the target texture map 206 to determine pixel locations at which the decal texture 208 touches the target texture map 206. The ray-cast operation also returns the position of the decal texture 208, from which the color (or other visual characteristic) of the decal texture 208 is copied to the target texture map 206.

Block 510 may be followed by block 512. At block 512, the object may be rendered with the decal texture applied thereon based on the placement of the decal texture onto the target texture map. For example, referring to FIG. 2, the reverse-projection pipeline component 130 may render the object based on the polygon mesh 202, the target texture map 206, and the decal texture 208 placed on the target texture map 206 (e.g., the resulting target texture map 212).

Figure 6:
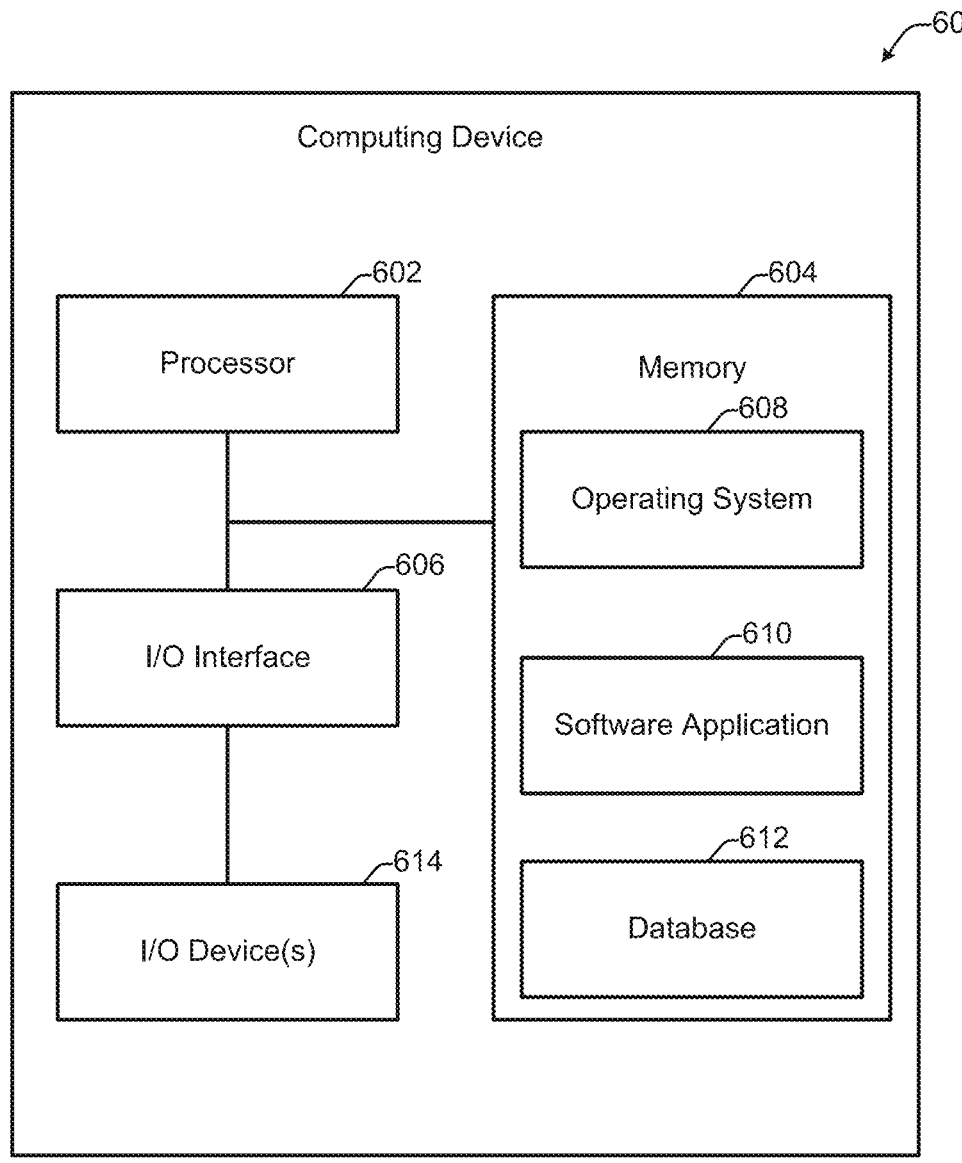
FIG. 6 is a block diagram illustrating an example computing device, in accordance with some implementations.

FIG. 6: Computing Device

Hereinafter, a more detailed description of various computing devices that may be used to implement different devices and/or components illustrated in FIG. 1 is provided with reference to FIG. 6.

FIG. 6 is a block diagram of an example computing device 600 which may be used to implement one or more features described herein, in accordance with some implementations. In one example, device 600 may be used to implement a computer device, (e.g., 102, 110 of FIG. 1), and perform appropriate operations as described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, software application 610, and associated database 612. In some implementations, the software application 610 can include instructions that enable processor 602 to perform the functions described herein. Software application 610 may include some or all of the functionality used to perform reverse projection to paint a decal texture onto a target texture map of an object. In some implementations, one or more portions of software application 610 may be implemented in dedicated hardware such as an application-specific integrated circuit (ASIC), a programmable logic device (PLD), a field-programmable gate array (FPGA), a machine learning processor, etc. In some implementations, one or more portions of software application 610 may be implemented in general purpose processors, such as a central processing unit (CPU) or a graphics processing unit (GPU). In various implementations, suitable combinations of dedicated and/or general purpose processing hardware may be used to implement software application 610.

For example, software application 610 stored in memory 604 can include instructions for retrieving user data, for displaying/rendering decal textures painted onto a target texture, and/or other functionality or software such as the reverse-projection pipeline component 130, virtual-experience engine 104, and/or virtual experience application 112. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 106), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, operating system 608, software application 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online virtual experience server 102 are described as performing operations as described in some implementations herein, any suitable component or combination of components of online virtual experience server 102, or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
receiving, by a processor, a polygon mesh of an object;
determining, by the processor, a positional map and a normal map associated with the polygon mesh by applying a rasterization function to the polygon mesh;
receiving, by the processor, a target texture map associated with the object and a decal texture to be placed on the target texture map;
determining, by the processor, a position, an orientation, and a scale of the decal texture with respect to a local space of the polygon mesh by applying a transform matrix to the target texture map and the decal texture;
determining, by the processor, placement of the decal texture onto the target texture map by performing a per-pixel projection operation based on the positional map associated with the polygon mesh, the normal map associated with the polygon mesh, and the position, the orientation, and the scale of the decal texture; and
rendering, by the processor, the object with the decal texture applied thereon based on the placement of the decal texture onto the target texture map.

2. The method of claim 1, wherein performing the per-pixel projection operation comprises performing back-face culling based on the normal map to determine visible surfaces of the polygon mesh of the object.

3. The method of claim 1, wherein performing the per-pixel projection operation comprises performing a plurality of dot-product computations based on the target texture map and the decal texture to determine a set of pixels associated with a projection of the decal texture onto the target texture map.

4. The method of claim 3, wherein performing the per-pixel projection operation further comprises performing a ray-cast operation on the set of pixels to determine pixel locations at which the decal texture touches the target texture map.

5. The method of claim 4, wherein performing the per-pixel projection operation further comprises applying a color-value associated with the decal texture to the pixel locations at which the decal texture touches the target texture map.

6. The method of claim 5, wherein rendering the object comprises rendering the object with the color-value associated with the decal texture applied to the pixel locations at which the decal texture touches the target texture map.

7. The method of claim 1, wherein:
the positional map indicates local-space coordinates of pixels associated with the polygon mesh, and
the normal map indicates a respective normal vector for one or more mesh faces of the polygon mesh.

8. A computing device, comprising:
a processor; and
a memory coupled to the processor and storing instructions, which when executed by the processor, cause the processor to perform operations comprising:
receiving a polygon mesh of an object;
determining a positional map and a normal map associated with the polygon mesh by applying a rasterization function to the polygon mesh;
receiving a target texture map associated with the object and a decal texture to be placed on the target texture map;
determining a position, an orientation, and a scale of the decal texture with respect to a local space of the polygon mesh by applying a transform matrix to the target texture map and the decal texture;
determining placement of the decal texture onto the target texture map by performing a per-pixel projection operation based on the positional map associated with the polygon mesh, the normal map associated with the polygon mesh, and the position, the orientation, and the scale of the decal texture; and
rendering the object with the decal texture applied thereon based on the placement of the decal texture onto the target texture map.

9. The computing device of claim 8, wherein performing the per-pixel projection operation comprises performing back-face culling based on the normal map to determine visible surfaces of the polygon mesh of the object.

10. The computing device of claim 8, wherein performing the per-pixel projection operation comprises performing a plurality of dot-product computations based on the target texture map and the decal texture to determine a set of pixels associated with a projection of the decal texture onto the target texture map.

11. The computing device of claim 10, wherein performing the per-pixel projection operation further comprises performing a ray-cast operation on the set of pixels to determine pixel locations at which the decal texture touches the target texture map.

12. The computing device of claim 11, wherein performing the per-pixel projection operation further comprises applying a color-value associated with the decal texture to the pixel locations at which the decal texture touches the target texture map.

13. The computing device of claim 12, wherein rendering the object comprises rendering the object with the color-value associated with the decal texture applied to the pixel locations at which the decal texture touches the target texture map.

14. The computing device of claim 8, wherein:
the positional map indicates local-space coordinates of pixels associated with the polygon mesh, and
the normal map indicates a respective normal vector for one or more mesh faces of the polygon mesh.

15. A non-transitory computer-readable medium with instructions stored thereon that, when executed by a processor, cause the processor to perform operations comprising:

receiving a polygon mesh of an object;

determining a positional map and a normal map associated with the polygon mesh by applying a rasterization function to the polygon mesh;

receiving a target texture map associated with the object and a decal texture to be placed on the target texture map;

determining a position, an orientation, and a scale of the decal texture with respect to a local space of the polygon mesh by applying a transform matrix to the target texture map and the decal texture;

determining placement of the decal texture onto the target texture map by performing a per-pixel projection operation based on the positional map associated with the polygon mesh, the normal map associated with the polygon mesh, and the position, the orientation, and the scale of the decal texture; and rendering the object with the decal texture applied thereon based on the placement of the decal texture onto the target texture map.

16. The non-transitory computer-readable medium of claim 15, wherein performing the per-pixel projection operation comprises performing back-face culling based on the normal map to determine visible surfaces of the polygon mesh of the object.

17. The non-transitory computer-readable medium of claim 15, wherein performing the per-pixel projection operation comprises performing a plurality of dot-product computations based on the target texture map and the decal texture to determine a set of pixels associated with a projection of the decal texture onto the target texture map.

18. The non-transitory computer-readable medium of claim 17, wherein performing the per-pixel projection operation further comprises performing a ray-cast operation on the set of pixels to determine pixel locations at which the decal texture touches the target texture map.

19. The non-transitory computer-readable medium of claim 18, wherein performing the per-pixel projection operation further comprises applying a color-value associated with the decal texture to the pixel locations at which the decal texture touches the target texture map.

20. The non-transitory computer-readable medium of claim 19, wherein rendering the object comprises rendering the object with the color-value associated with the decal texture applied to the pixel locations at which the decal texture touches the target texture map.

\* \* \* \* \*